Sept. 8, 1936.   E. G. BUSSE   2,053,548
RAILWAY BRAKE GEAR DEVICE
Filed March 8, 1935   2 Sheets-Sheet 1
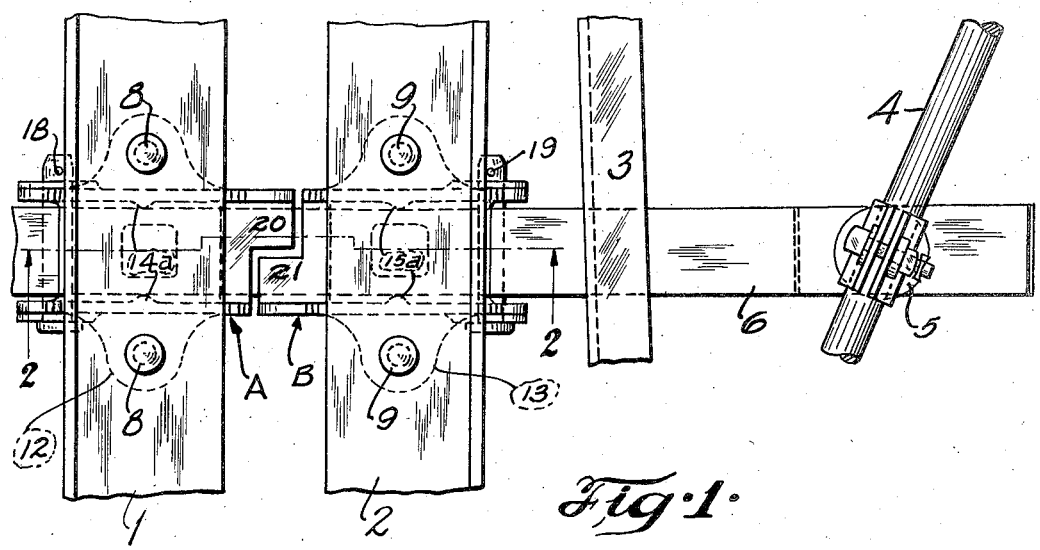
Fig. 1.
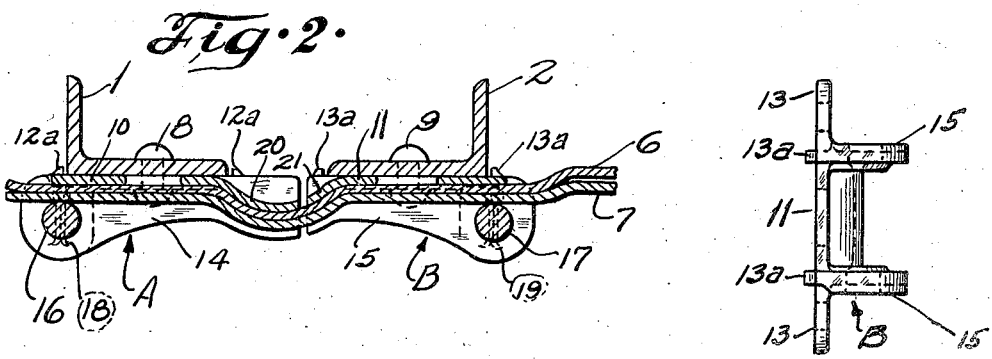
Fig. 2.
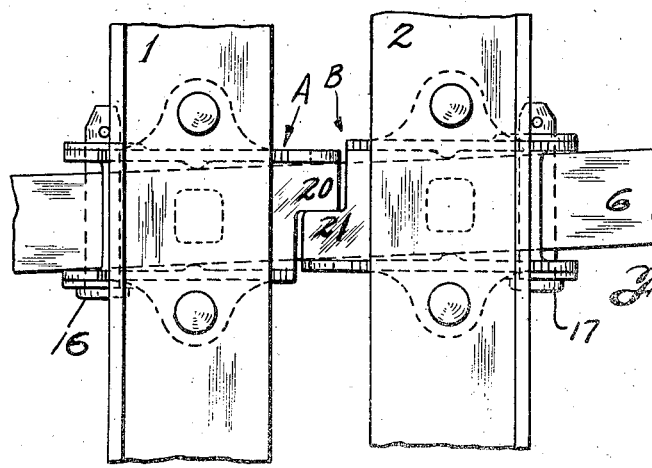
Fig. 3.
Fig. 4.
INVENTOR
Edwin G. Busse
By Rodney Bedell
ATTORNEY Sept. 8, 1936.  E. G. BUSSE  2,053,548
RAILWAY BRAKE GEAR DEVICE
Filed March 8, 1935  2 Sheets-Sheet 2
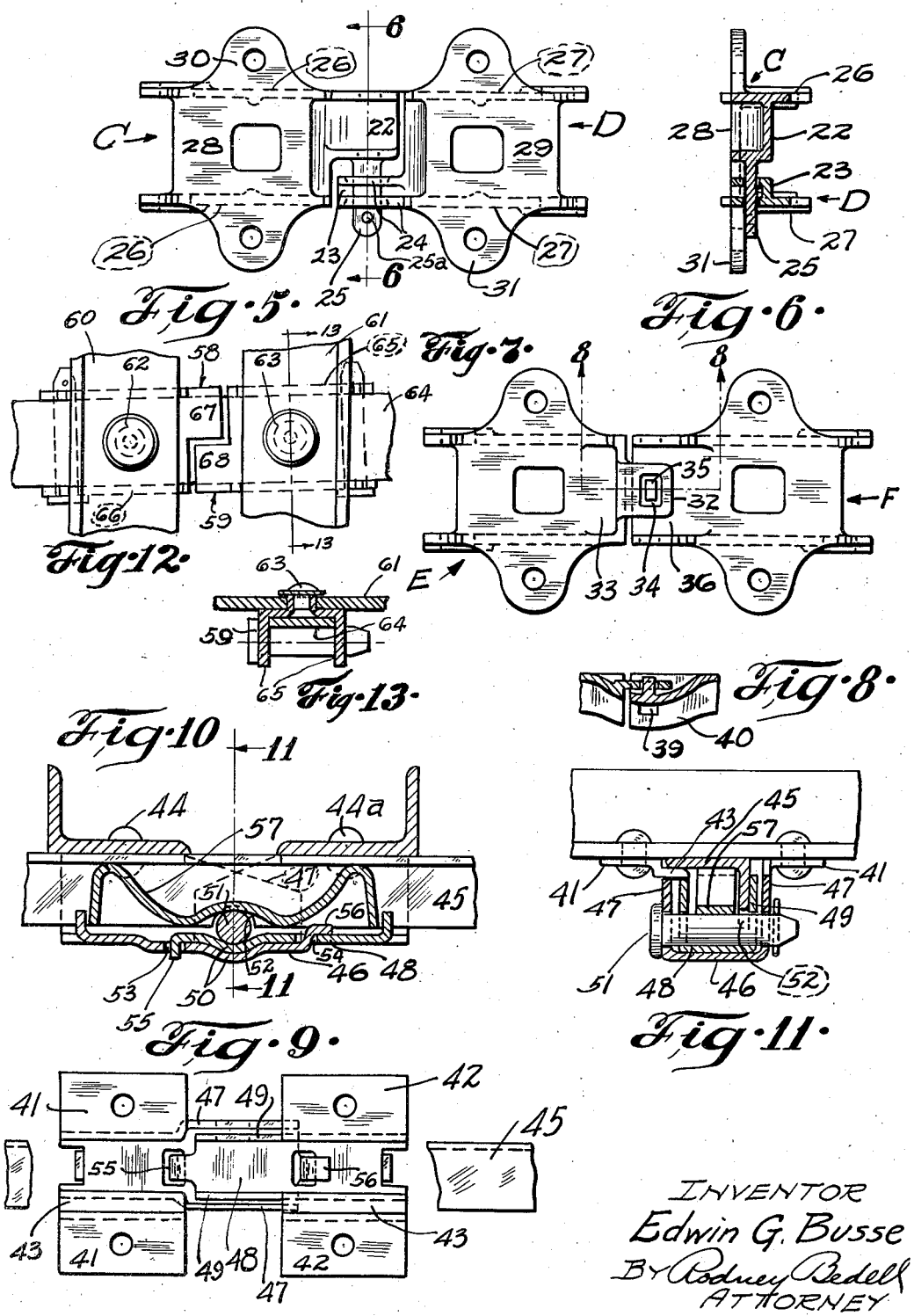

Patented Sept. 8, 1936

2,053,548

UNITED STATES PATENT OFFICE 2,053,548

RAILWAY BRAKE GEAR DEVICE

Edwin G. Busse, Chicago, Ill., assignor to Chicago Railway Equipment Company, Chicago, Ill., a corporation of Illinois Application March 8, 1935, Serial No. 9,942

22 Claims. (Cl. 188—210)

This invention relates to guard, guide, or support means for railway brake beams and consists in novel structure for attaching the brake beam guard, guide, or support member to a supporting truck part.

The spring planks of railway trucks, and particularly freight trucks, upon which the brake beam auxiliary supports have generally been mounted, are subjected to substantial twisting and bending forces due to the weaving of the side frames, which motion is greatest when the truck is rounding a curve. These forces have at times caused cracking and breaking of spring planks, which condition is aggravated where holes or other recesses are provided in the spring plank for mounting the brake beam support or safety guard.

In an effort to remedy this condition, spring planks in some cases have been increased in size and strength, and in other cases have been made lighter and more flexible. The strengthened or reinforced spring planks increase the weight of the truck and as has been found, do not successfully eliminate the cracks and breaks mentioned above. The light flexible planks do not provide adequate support for the brake beam safety guard, particularly in case the beam is dropped onto the safety guard for any reason and also have given trouble due to breakage. To attain greater flexibility, spring planks have also been formed of two separate parts spaced longitudinally of the truck. This form of spring plank functions satisfactorily and effects a substantial saving in weight, an advantage now greatly appreciated by railroad men.

Some difficulty has been experienced in attaching the brake beam support and safety guard members to the two-part spring planks as these members cannot be rigidly attached to both parts of the spring plank without loss of flexibility of the spring plank. Various means tried for overcoming this difficulty have resulted in excessive wear and looseness in the parts, or breaking out of the attaching rivets.

An object of the present invention is to provide means for securely mounting a brake beam guard, guide, or support member on a two-part spring plank without resisting the relative movement of the parts of the spring plank.
A more detailed object is to provide a novel two-part bracket for mounting a brake beam guard, guide, or support member on truck parts subject to relative movement, the bracket preventing lateral, longitudinal, and vertical displacement of the guard, guide, or support member while permitting limited swiveling thereof.

These objects and others hereafter appearing are attained by the structures illustrated in the accompanying drawings, in which—
Figure 1 is a top view of railway truck parts embodying the invention.

Figure 2 is a vertical longitudinal section taken on the line 2—2 of Figure 1.

Figure 3 is a detail end view of the bracket in Figure 1.

Figure 4 is a view similar to Figure 1 but showing the parts of the spring plank and support bracket in slightly displaced positions.

Figure 5 is a top view of a modified form of brake beam support bracket.

Figure 6 is a vertical transverse section taken on the line 6—6 of Figure 5.

Figure 7 is a top view of another form of brake beam support bracket.

Figure 8 is a detail vertical longitudinal section taken on the line 8—8 of Figure 7.

Figure 9 is a top view showing still another form of support bracket.

Figure 10 is a vertical section similar to Figure 2 showing the bracket in Figure 9 associated with a spring plank and brake beam safety guard.

Figure 11 is a vertical transverse section taken on the line 11—11 of Figure 10.

Figure 12 is a view corresponding to Figure 4 and showing another form of support bracket.

Figure 13 is a vertical transverse section taken on the line 13—13 of Figure 12.

Figures 1 to 4 show a spring plank including the separate parts 1 and 2 spaced longitudinally of the truck and extending between the truck side frames (not shown) in the usual manner. Adjacent the spring plank is a truss type brake beam including the compression member 3 and tension member 4 provided with a support shoe or chair 5 slidably engaging the brake beam guard, guide, or support strap 6. Extending beneath the strap 6 is a reinforcing member 7.

Secured to the parts 1 and 2 of the spring plank by rivets 8 and 9 are the complementary elements A and B of a bracket structure for mounting the brake beam guard, guide, or support straps 6 and 7 on the spring plank. The bracket elements A and B include the horizontal webs 10 and 11 abutting the under-surfaces of the spring plank parts and terminating laterally in lugs 12 and 13 receiving rivets 8 and 9. The webs 10 and 11 also include lugs 12a and 13a receiving the spring plank parts therebetween. Bracket elements A and B also include depending flanges 14 and 15 receiving the straps 6 and 7. Pins 16 and 17, secured to the bracket by means of cotter keys 18 and 19, extend between the flanges 14 and 15, respectively, and support the straps 6 and 7.

At their adjacent inner edges, the bracket elements A and B include the longitudinally overlapping portions 20 and 21 which are downwardly offset as shown in Figure 2 and engage the depressed middle portion of the strap 6. The nested intermediate portions of the webs 10 and 11 and the straps 6 and 7 prevent longitudinal displacement of the straps. The straps 6 and 7 are preferably slightly distorted vertically by the pins 16 and 17 during assembly to prevent rattling.

The bracket flanges are spaced slightly farther apart than the side edges of the straps 6 and 7 and are provided with the restricted projections 14a and 15a engaging the straps and forming pivots about which the straps may swivel slightly, as shown in Figure 4, when the parts 1 and 2 of the spring plank are displaced horizontally by weaving or twisting of the side frames. The relative displacement of the support straps and brackets in Figure 4 is somewhat exaggerated for clearer illustration. Preferably the space between the overlapping portions 20 and 21 of the bracket elements is such that these portions engage each other at the same time that, or slightly before, the straps 6 and 7 engage the diagonally opposite flanges 14 and 15, during swiveling of the support straps, to protect these flanges. The support chair 5 will be made sufficiently wide to properly support the beam regardless of the slight swiveling of the straps 6 and 7.

Figures 5 and 6 show another form of bracket including the separate elements C and D having longitudinally overlapping depressed inner portions 22 and 23 for cooperating with depressed intermediate portions of the safety guard straps (not shown) to prevent longitudinal displacement thereof. The overlapping portion 23 of one of the bracket elements includes the upstanding flanges 24 with alined recesses receiving the lateral tongue 25 projecting from the portion 22 of the other bracket element. The tongue 25 is apertured at 25a for receiving a securing key or pin. The bracket includes depending flanges 26 and 27 and horizontal webs 28 and 29, as in the previous form, terminating at the sides in lugs 30 and 31 for receiving attaching rivets.

In Figures 7 and 8, the left hand element E of the bracket structure includes a tongue 32 projecting beyond the depressed inner portion 33 thereof and having a recess 34 receiving the lug 35 projecting from the depressed inner portion 36 of the other bracket element F. Small recesses 39 in the flanges 40 of the bracket element F serve for receiving a pin or key for engaging the depressed middle portion of the support strap to insure a tight fit with the bracket or increase the spring tension in the guard, guide, or support member.

In Figures 9, 10, and 11, the separate portions of the bracket structure include flanges 41 and 42 apertured for receiving the attaching rivets 44 and 44a. The intermediate portions of the bracket elements are depressed for receiving the angular brake beam safety guard member 45, one wall of each of the bracket elements being offset, as at 43, for receiving the edge of the horizontal flange of the safety guard angle.

The bracket elements include longitudinally overlapping inner portions, as in the previous forms, that of the left hand element comprising a bottom web 46 and upstanding side flanges 47, and that of the right hand bracket element including bottom web 48 and upstanding flanges 49. The bottom webs 46 and 48 are provided with nested recesses, as at 50, and the side flanges 47 and 49 are apertured for receiving a pin 51 seated in a recess 52 in the vertical flange of the safety guard angle for preventing longitudinal displacement thereof. The overlapping bottom webs 46 and 48 also include the recesses 53 and 54 and the tongues 55 and 56 loosely received therein.

Resting on top of the pin 51 is a spring element 57 of approximately W shape and engaging the horizontal flange of the safety guard angle 45 to secure the same firmly in position and prevent rattling.

In Figures 7 and 8, and 9, 10, and 11, no pivot projections are provided for engaging the sides of the brake beam safety guard members, these members fitting loosely between the sides of the bracket elements so as to permit slight swiveling thereof to the diagonal position indicated in Figure 4.

In Figures 12 and 13, a pair of separate bracket elements 58 and 59 are attached to spring plank angles 60 and 61 by means of pivots 62 and 63 whereby the brackets may swivel slightly during relative longitudinal shifting of angles 60 and 61. The brake beam guard, guide, or support strap 64 is substantially immovable laterally between the bracket flanges 65 and 66 but must be movable longitudinally in order to permit swiveling of the bracket elements and the guard, guide, or support strap. The depressed portions 67 and 68 of the bracket elements and the abutting middle portion of the strap 64 accordingly are arranged to permit this slight longitudinal movement of the strap.

In each of the forms, the overlapping portions of the separate bracket elements assist in alining the bracket elements during application to the spring plank and also cooperate with the brake beam safety guard and support to prevent longitudinal displacement thereof.

In Figures 5 to 11, inclusive, the interlocking features do not prevent relative movement of the bracket elements so as to restrict the flexibility of the supporting spring plank. The guard, guide, or support members in all forms are securely attached to the spring plank but are free to swivel slightly relative to the spring plank to permit flexing of the spring plank parts.

The various bracket structures shown are for the purpose of illustration and these may be modified in various respects as will occur to those skilled in the art. The exclusive use of all such modifications as come within the spirit of the appended claims is contemplated.

I claim:

1. Bracket structure for mounting a brake beam guard, guide, or support member on railway truck parts capable of relative movement, said bracket structure comprising spaced elements for individual attachment to said truck parts respectively and to said guard, guide, or support member, said bracket elements extending towards each other to provide a substantially continuous bracket surface for engaging said member and being relatively movable when normally assembled with said truck parts and said guard, guide, or support member to accommodate relative movement of said truck parts.

2. In combination in a railway truck, a two-part spring plank, individual bracket elements attached to each of the spring plank parts and each element being movable relatively to the other element and spring plank part, and a brake beam guard, guide, or support member mounted in said bracket elements, at least one of said elements including structure extending towards the other and providing an intermediate support for said member.

3. In combination in a railway truck, a two-part spring plank, a separate bracket element rigidly attached to each of the spring plank parts and having spaced flanges, a brake beam guard, guide, or support member, and means pivotally mounting said member on each of said bracket elements between said flanges and adapted to permit relative movement of the spring plank parts without straining said parts, said member, or said means.

4. In combination, a brake beam guard, guide, or support member, and bracket structure for mounting said member on railway truck parts capable of relative movement, said bracket structure including normally flexibly associated elements for attachment to said truck parts and means for flexible attachment of said guard, guide, or support member to said elements to accommodate relative movement of said elements with said truck parts, said bracket elements including coacting means for correlating said elements in application to said truck parts.

5. In combination, a brake beam guard, guide, or support member, and bracket structure for mounting said member on railway truck parts capable of relative movement, said bracket structure including normally flexibly associated elements for attachment to said truck parts and means for flexible attachment of said guard, guide, or support member to said elements to accommodate relative movement of said elements with said truck parts, one of said bracket elements having a recess and the other element having a projection insertable into said recess to aline said elements in application thereof to said truck parts.

6. In combination in a railway truck, relatively movable parts, a brake beam guard, guide, or support member, and bracket structure mounting said member on the truck and comprising flexibly associated elements having depending flanges and attached to said truck parts, said guard, guide, or support member being flexibly supported by said elements so as to accommodate relative movement of said truck parts.

7. Structure as specified in claim 6 in which said guard, guide, or support member is capable of swiveling horizontally in said elements.

8. In combination, a railway truck two-part spring plank, a brake beam guard, guide, or support member carried thereby, and bracket structure mounting said member on said spring plank and comprising relatively movable flanged parts each attached to a part of said spring plank and being of substantial extent transversely of said part, said guard, guide, or support member being flexibly attached to said bracket elements so as to accommodate relative movement of said spring plank parts.

9. Bracket structure for mounting a brake beam guard, guide, or support member on relatively movable parts of a railway truck and comprising separate elements each for attachment to one of said parts and to said member, each of said elements having laterally spaced structure for receiving said guard, guide, or support member therebetween and preventing lateral movement of said member while permitting swiveling thereof.

10. Bracket structure for mounting a brake beam guard, guide, or support member on relatively movable railway truck parts and comprising separate elements each for attachment to one of said truck parts and each having horizontally spaced restricted projections for pivotally receiving the guard, guide, or support member therebetween and at least one of said elements having an offset portion for distorting the guard, guide, or support member when applied to the bracket to prevent rattling.

11. In combination in a railway truck relatively movable parts, a brake beam guard, guide, or support member, and bracket structure mounting said member on said parts and including separate elements each attached to one of said parts, each of said elements having laterally spaced flanges receiving said member therebetween and a pin securing said member thereto, there being projections on the inner faces of said flanges for engaging the sides of said member and preventing lateral movement of said member but permitting swiveling thereof.

12. In combination in a railway truck, relatively movable parts, a brake beam guard, guide, or support member, and separate bracket elements mounting said member on said truck parts, said bracket elements having overlapping portions vertically offset from the adjacent portions thereof for preventing longitudinal displacement of said member.

13. Structure as specified in claim 12 in which one of said overlapping portions has a recess and the other portion has a tongue element insertable into said recess for interlocking said bracket elements.

14. In combination in a railway truck, relatively movable parts, a brake beam guard, guide, or support member, bracket structure securing said member to said truck parts and comprising separate elements each attached to one of said parts, and spring means in said bracket structure and engaging said member to prevent rattling.

15. In combination in a railway truck, relatively movable parts, a brake beam guard, guide, or support member, and bracket structure securing said member to said truck parts and comprising separate elements each attached to one of said parts, said elements having overlapping portions each with a recess and a tongue element, the tongue element of each portion being inserted in the recess in the other portion for interlocking said bracket elements.

16. A pair of brackets for mounting a brake beam guard, guide, or support member on a truck spring plank which includes parts spaced from each other, there being means for securing each of said brackets to a corresponding part of said spring plank independently of the other bracket, and the two brackets including cooperating elements forming a substantially continuous engaging structure for said member from side to side of said spring plank.

17. A pair of brackets for mounting a brake beam guard, guide, or support member on a truck spring plank which includes parts spaced from each other, there being means for securing each of said brackets to a corresponding part of said spring plank independently of the other bracket, and the two brackets including cooperating elements forming a substantially continuous engaging structure for said member from side to side of said spring plank and each of said brackets having elements for engaging the sides of said member to position it, said latter mentioned elements being constructed and arranged to permit relative movement of said brackets with the spring plank parts to which they are secured.

18. In combination, railway truck parts susceptible to relative movement during normal operation of the truck, bracket elements carried by said parts, and a brake beam guard, guide, or support member carried by said elements, said bracket elements being movable relative to said parts so as to permit relative movement of said parts.

19. Structure as specified in claim 18 in which said bracket elements are pivoted to said truck parts.

20. In a railway truck, a two-part spring plank, a brake beam guard, guide, or support member, and means for attaching said member to said spring plank comprising separate structure secured to each spring plank part, an element between said parts, and a spring engaging said element and said member and yieldingly securing said member to said structure.

21. In combination, railway truck spaced spring plank parts, a brake beam guard, guide, or support member, and bracket means attaching said member to said spring plank parts comprising a portion secured to each of said spring plank parts and member-engaging structure between said portions, said bracket means and said guard, guide, or support member being arranged to permit relative movement of said spring plank parts without straining the same or said attaching means.

22. The combination of elements specified in claim 21 including a spring interposed between said bracket means and said guard, guide, or support member.

EDWIN G. BUSSE.